(12) United States Patent
Evans et al.

(10) Patent No.: US 9,778,834 B2
(45) Date of Patent: Oct. 3, 2017

(54) MULTIDIMENSIONAL SPLIT VIEW FOR A PIVOT TABLE OR OTHER GRID-BASED COMPONENT

(71) Applicant: Oracle International Corporation, Redwood Shores, CA (US)

(72) Inventors: James Evans, Burlington, MA (US); Hendrik van den Broek, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 350 days.

(21) Appl. No.: 13/956,263

(22) Filed: Jul. 31, 2013

(65) Prior Publication Data

US 2014/0351746 A1 Nov. 27, 2014

Related U.S. Application Data

(60) Provisional application No. 61/826,785, filed on May 23, 2013.

(51) Int. Cl.
*G06F 3/0485* (2013.01)
*G06F 17/24* (2006.01)

(52) U.S. Cl.
CPC .......... *G06F 3/0485* (2013.01); *G06F 17/245* (2013.01); *G06F 17/246* (2013.01); *G06F 2203/04803* (2013.01)

(58) Field of Classification Search
CPC ............................. G06F 3/0485; G06F 17/245
USPC ....................................................... 715/784
See application file for complete search history.

(56) References Cited

U.S. PATENT DOCUMENTS

| | | | | |
|---|---|---|---|---|
| 5,584,024 A | * | 12/1996 | Shwartz | G06F 17/30392 |
| 5,913,032 A | * | 6/1999 | Schwartz | G06F 9/543 |
| | | | | 709/201 |
| 6,874,128 B1 | * | 3/2005 | Moore | G06F 3/0486 |
| | | | | 715/759 |
| 6,912,694 B1 | * | 6/2005 | Harrison | G06F 3/0485 |
| | | | | 715/784 |
| 7,200,615 B2 | * | 4/2007 | Eschbach | G06F 17/211 |
| | | | | 707/915 |
| 2002/0054105 A1 | * | 5/2002 | Breuer | G06F 17/30398 |
| | | | | 715/764 |
| 2007/0079230 A1 | * | 4/2007 | Vignet | G06F 3/0485 |
| | | | | 715/212 |

(Continued)

OTHER PUBLICATIONS

"How to Split an Excel 2013 Worksheet into Panes", by Greg Harvey, published Feb. 2, 2013, taken from http://www.dummies.com/how-to/content/how-to-split-an-excel-2013-worksheet-into-panes.html, pp. 1-5.*

(Continued)

*Primary Examiner* — William Bashore
*Assistant Examiner* — Gregory A Distefano
(74) *Attorney, Agent, or Firm* — Trellis IP Law Group, PC

(57) ABSTRACT

A data view may be into multiple data panes. Splits between data panes may be horizontal or vertical, allowing data panes to be arranged horizontally and vertically. Scroll boundaries are set for each pair of adjacent data panes, such that each data pane may only scroll through a portion of the data on its side of the scroll boundary. Data panes may be scrolled independently in the direction of a split. Data panes may be scrolled together perpendicular to the direction of a split.

21 Claims, 3 Drawing Sheets

(56) References Cited

U.S. PATENT DOCUMENTS

| | | | | |
|---|---|---|---|---|
| 2007/0168855 A1* | 7/2007 | Patel | ................. | G06F 17/30905 |
| | | | | 715/205 |
| 2012/0324329 A1* | 12/2012 | Ceponkus | ............. | G06F 3/0485 |
| | | | | 715/227 |
| 2014/0208217 A1* | 7/2014 | Carasso | ................. | G06F 17/30 |
| | | | | 715/738 |

OTHER PUBLICATIONS

"Split a Table into Two or more Tables in Word 2013", by Satya Prakash, published Nov. 14, 2012, taken from http://www.c-sharpcorner.com/UploadFile/8ea152/split-a-table-into-two-or-more-than-two-table-in-word-2013/, pp. 1-4.*

"How to Insert an Excel Spreadsheet into Word 2010", taken from http://www.ekaru.com/blog/bid/59474/How-to-Insert-an-Excel-Spreadsheet-into-Word-2010, published Jul. 12, 2011, pp. 1-4.*

* cited by examiner

FIG. 2

MULTIDIMENSIONAL SPLIT VIEW FOR A PIVOT TABLE OR OTHER GRID-BASED COMPONENT

CROSS REFERENCES TO RELATED APPLICATIONS

This application claims priority from U.S. Provisional Patent Application Ser. No. 61/826,785, entitled "Multidimensional Split View For A Pivot Table Or Other Grid-Based Component," filed on May 23, 2013, which is hereby incorporated by reference as if set forth in full in this application for all purposes.

BACKGROUND

The field of the invention relates to user interfaces and specifically to systems and methods for presenting different parts of data sets for comparison. Many applications operate on large data tables that cannot be displayed in their entirety on a single display screen. To compensate for this, these applications may only display a portion of the data set on screen at any time and allow users to scroll the data set in one or more dimensions to reveal portions of the data set that are off-screen. Scrolling may be accomplished via scrollbars, other user interface controls, or command inputs.

A problem arises when the user wishes to simultaneously view nonadjacent portions of the data set that are not close enough together to be on the screen at the same time. For example, a user may want to view data in table rows 1-5 and simultaneously view data in table rows 1001-1020. Although most displays are large enough to display these 25 rows simultaneously, there is not enough room to also present the intervening 995 rows of data.

One prior solution to this problem is to enable the user to split the data display into two or more regions or data panes, each of which can be scrolled or navigated independently. Continuing with the above example, this would allow the display to be split into a top region or data pane that could be scrolled to view table rows 1-5 and a bottom region or data pane that could be scrolled to view table rows 1001-1020.

One problem with this existing solutions is that the two (or more) data panes each can be scrolled anywhere over the entire set. This leads to situations where the user inadvertently scrolls one data pane to show some or all of the same data as another data pane. Even worse, a user may scroll one data pane past the region of the data set of another data pane, so that the physical arrangement of the data panes contradicts the relative locations of their displayed data.

For example, a user may initially split and configure the display of a data set into a left data pane showing table columns 100-120 and a right data pane showing table columns 1000-1020. However, if the user scrolls the right data pane all the way to the left, the right data pane will display table columns 1-20. In this configuration, columns 100-120 will be displayed on the left (in the left data pane) and columns 1-20 will be displayed on the right (in the right data pane). This arrangement can be very confusing to the user because the physical arrangement of the data panes contradicts the natural order of the data.

SUMMARY

Embodiments of the invention enable users to split a display area into two or more data panes. The boundary between a pair of data panes may be horizontal or vertical, forming horizontal or vertical data panes respectively. Further embodiments of the invention may split the display area into both horizontal and vertical data panes at the same time, forming four or more data panes.

To facilitate the comparison of data between data panes, an embodiment of the invention sets a scroll boundary for each pair of adjacent data panes. Each data pane may only scroll through a portion of the data on its side of the scroll boundary. In a further embodiment, the scroll boundary is based on a user selection of a cell or other data entity at the time the data panes are created.

For example, a user may select column 50 of a data table and issue a split command. In response to this command, an example application may split the display area into left and right data panes and set the scroll boundary at column 50. The left data pane may be scrolled by the user from columns 1 to 50. However, this example application will not permit the user to scroll above column 50. Similarly, the right data pane may be scrolled by the user from columns 50 up to the end of the data set. However, this example application will not permit the user to scroll below column 51.

In an embodiment, each data pane may be scrolled independently in the direction of the split. In a further embodiment, both data panes may be scrolled together in a direction different than that of the split. Continuing with the above example, if the display area is divided into left and right data panes with a scroll boundary at column 50, the left and right data panes may be scrolled independently in the horizontal directions up to the scroll boundary. However, both data panes may be scrolled together in the vertical direction, for example using a single user interface element. In yet a further embodiment, additional data, such as row or column headers or legends, may remain visible regardless of the scrolling of the data panes.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIG. 2 illustrates an example user interface display implementing an embodiment of the invention.

DETAILED DESCRIPTION OF EMBODIMENTS

Embodiments of the invention enable users to split a display area into two or more data panes. To facilitate the comparison of data between data panes, an embodiment of the invention sets a scroll boundary for each pair of adjacent data panes. Each data pane may only scroll through a portion of the data on its side of the scroll boundary. In a further embodiment, the scroll boundary is based on a user selection of a cell or other data entity at the time the data panes are created.

Figure 1:
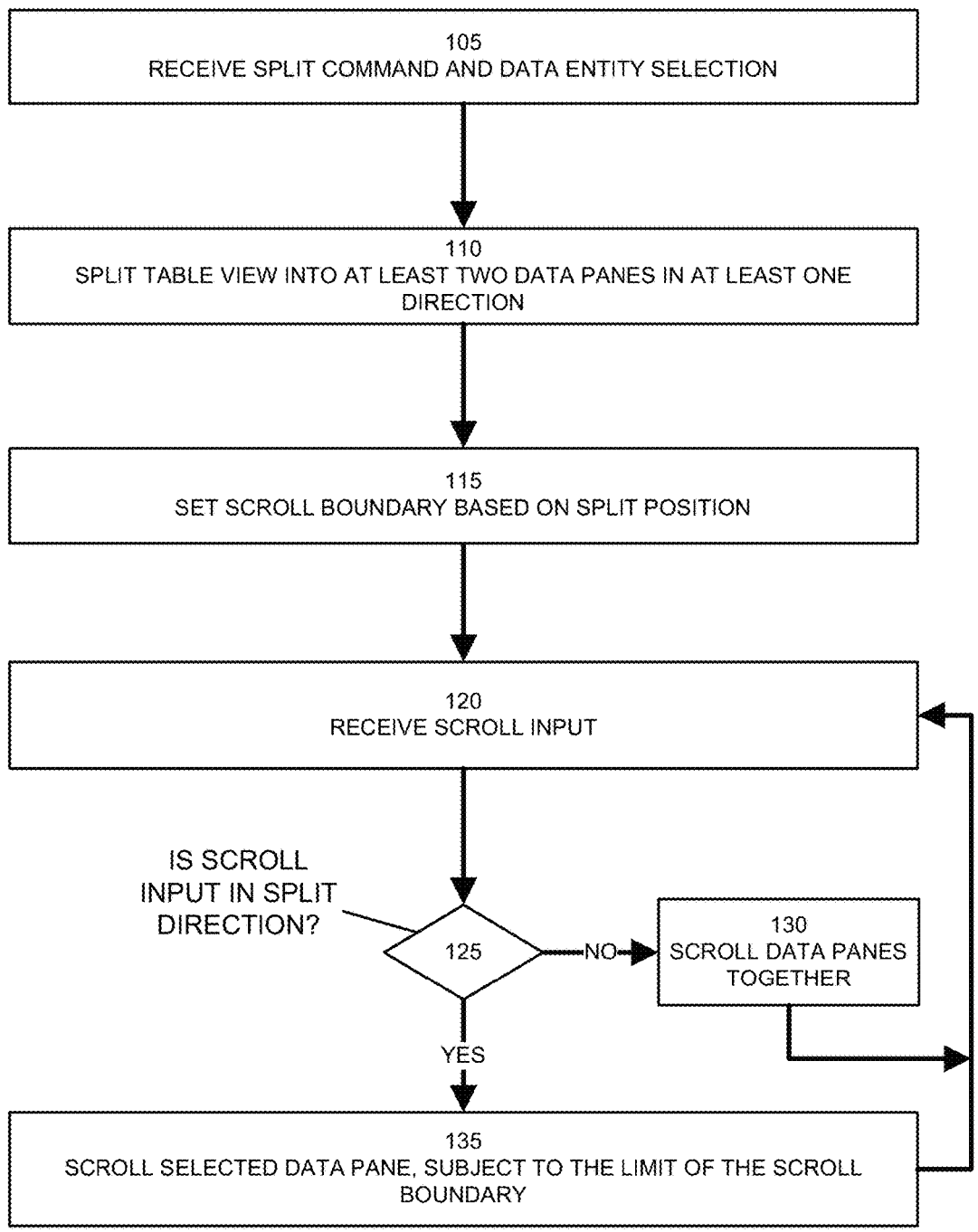
FIG. 1 illustrates a method of limiting scrolling in data panes according to an embodiment of the invention.

FIG. 1 illustrates a method 100 of limiting scrolling in data panes according to an embodiment of the invention. Step 105 receives a split command and optionally a data entity selection, such as the selection of a row, column, or cell of a table.

Step 110 splits the table view into at least two data panes in at least one direction.

Step 115 sets a scroll boundary for the newly-created data panes. In an embodiment, the scroll boundary is based on the selected data entity. For example, if a table column or a table cell in a given table column is selected and a vertical data split is selected, then the scroll boundary may be set at the selected column or the column of the selected table cell. Similarly, if a table row or a table cell in a given row column is selected and a horizontal data split is selected, then the scroll boundary may be set at the selected row or the row of the selected table cell.

Step 120 receives a scroll input from a user. Scroll inputs may be received via interactions through user interface widgets or directly via mouse inputs, keyboard inputs, touch inputs, or other commands.

Decision block 125 determines if the scroll is in the split direction. The split direction is defined as the direction in which each data pane may be scrolled independently. The split direction is horizontal for data panes arranged side-by-side around a column boundary and vertical for data panes arranged top-to-bottom around a row boundary.

If the scroll input is not in the scroll direction, step 130 scrolls both data panes together over the data. If the scroll input is in the scroll direction, step 135 scrolls only the selected data pane by the amount requested by the user, subject to the limit of the scroll boundary. If the scroll input would scroll the selected pane beyond the scroll boundary, step 135 limits the scrolling of the selected data pane to the scroll boundary.

Steps 120-135 may be repeated for additional user scroll inputs and/or other selected data panes, until a user gives a command to remove the split and the display area is returned to a single view of the data set.

Figure 2:
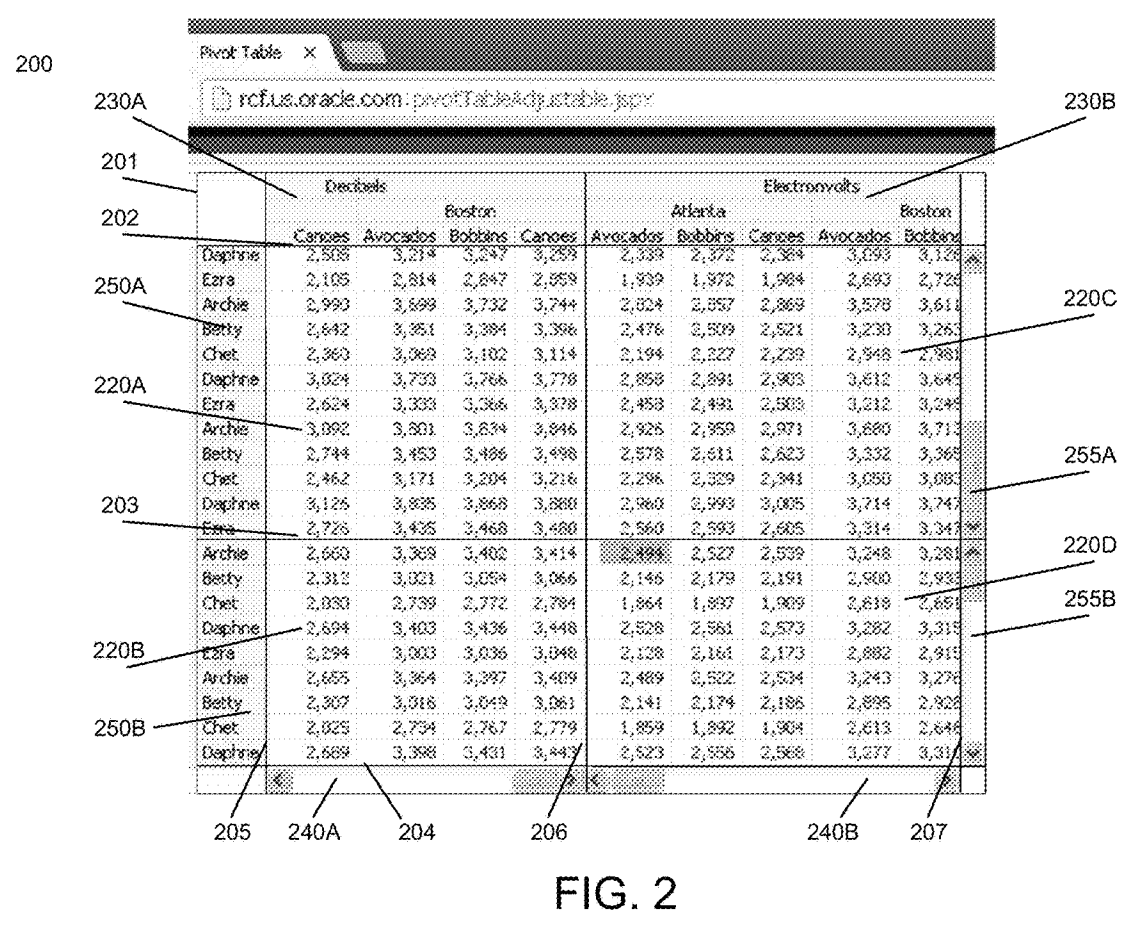

FIG. 2 illustrates an example user interface display 200 implementing an embodiment of the invention. A table view 201 is partitioned into four data panes: 220A, 220B, 220C and 220D. The data panes 220A and 220B are separated from the data panes 220C and 220D by scroll boundary 206. The data panes 220A and 220C are separated from the data panes 220B and 220D by scroll boundary 203.

Data panes 220A and 220B may share an optional column header pane 230A and a horizontal scrollbar 240A. Data panes 220C and 220D may share an optional column header pane 230B and a horizontal scrollbar 240B.

Likewise, data panes 220A and 220C may share an optional row header pane 250A and a vertical scrollbar 255A. Data panes 220B and 220D may share an optional row header pane 250B for row headers and a vertical scrollbar 255B. Column header boundary 202 separates column headers 230 from the data panes 220, and row header boundary 205 separates row headers 250 from the data panes 220. Data pane boundary 204 separates horizontal scrollbars 240 from headers and data, and data pane boundary 207 separates vertical scrollbars 255 from headers and data.

A user can horizontally scroll the tabular formatted data in data panes 220A and 220B simultaneously (along with any optional header 230A) using horizontal scrollbar 240A. Similarly, a user can horizontally scroll tabular formatted data in data panes 220C and 220D simultaneously (along with any optional header 230B) using horizontal scrollbar 240B.

According to an embodiment of the invention, scroll boundary 206 is associated with a scroll boundary, which may be defined by the location in the tabular formatted data where the scroll boundary 206 was originally set. As an example, if the tabular formatted data spans columns numbered 1 through 10,000, and the scroll boundary 206 was inserted to the left of column 5,000, then the left hand data panes 220A and 220B can scroll from column 1 through 4,999 and the right hand data panes 220C and 220D can scroll from column 5,000 through 10,000. An embodiment of the invention prevents the left side data panes 220A and 220B from scrolling to column 5000 or higher and the right side data panes 220C and 220D from scrolling to column 4,999 or lower.

Similarly, a user can vertically scroll tabular formatted data in data panes 220A and 220C simultaneously (along with any optional row header 250A) using vertical scrollbar 255A. Similarly, a user can vertically scroll tabular formatted data in data panes 220B and 220D simultaneously (along with any optional row header 250B) using vertical scrollbar 255B.

According to an embodiment of the invention, scroll boundary 203 is associated with a scroll boundary, which may be defined by the location in the tabular formatted data where the scroll boundary 203 was originally set. As an example, if the tabular formatted data spans rows numbered 1 through 10,000, and the scroll boundary 203 was inserted above row 5,000, then the top data panes 220A and 220C can scroll from row 1 through 4,999, and the bottom data panes 220B and 220D can scroll from row 5,000 to 10,000. An embodiment of the invention prevents top data panes 220A and 220C from scrolling to row 5000 or higher and the bottom data panes 220B and 220D from scrolling to row 4,999 or lower.

This embodiment of the invention does not include vertical scrolling of the column headers. Similarly, it does not include horizontal scrolling of the row headers. However, other embodiments of the invention may include scrolling of headers.

Whereas the embodiment in FIG. 2 has only two vertical data panes and two horizontal data panes, yet other embodiments may include more vertical and/or horizontal data panes. In general, when tabular formatted data is split into N vertical data panes, where N is two or larger, then the N vertical data panes will be horizontally adjacent to each other and show data from non-overlapping columns. Scrolling of each data pane is limited to the data area between its lower column boundary and its higher column boundary. Similarly, when tabular formatted data is split into M horizontal data panes, where M is two or larger, then the M horizontal data panes will be vertically adjacent to each other and show data from non-overlapping rows. Scrolling of each data pane is limited to the tabular formatted data between its lower row boundary and its higher row boundary. In these further embodiments, each of the horizontal and/or vertical splits may optionally operate as a scroll boundary as described above.

Embodiments of the invention may be implemented as standalone applications or as web-based applications implemented using a combination of client-side and server-side code. In the latter implementation, virtualized scrolling may be used to dynamically retrieve portions of the data set from the server as needed, with the web-browser or client application locally caching portions of the data set corresponding with the screen display as well as nearby portions of the data set to provide the appearance of smooth scrolling.

Figure 3:
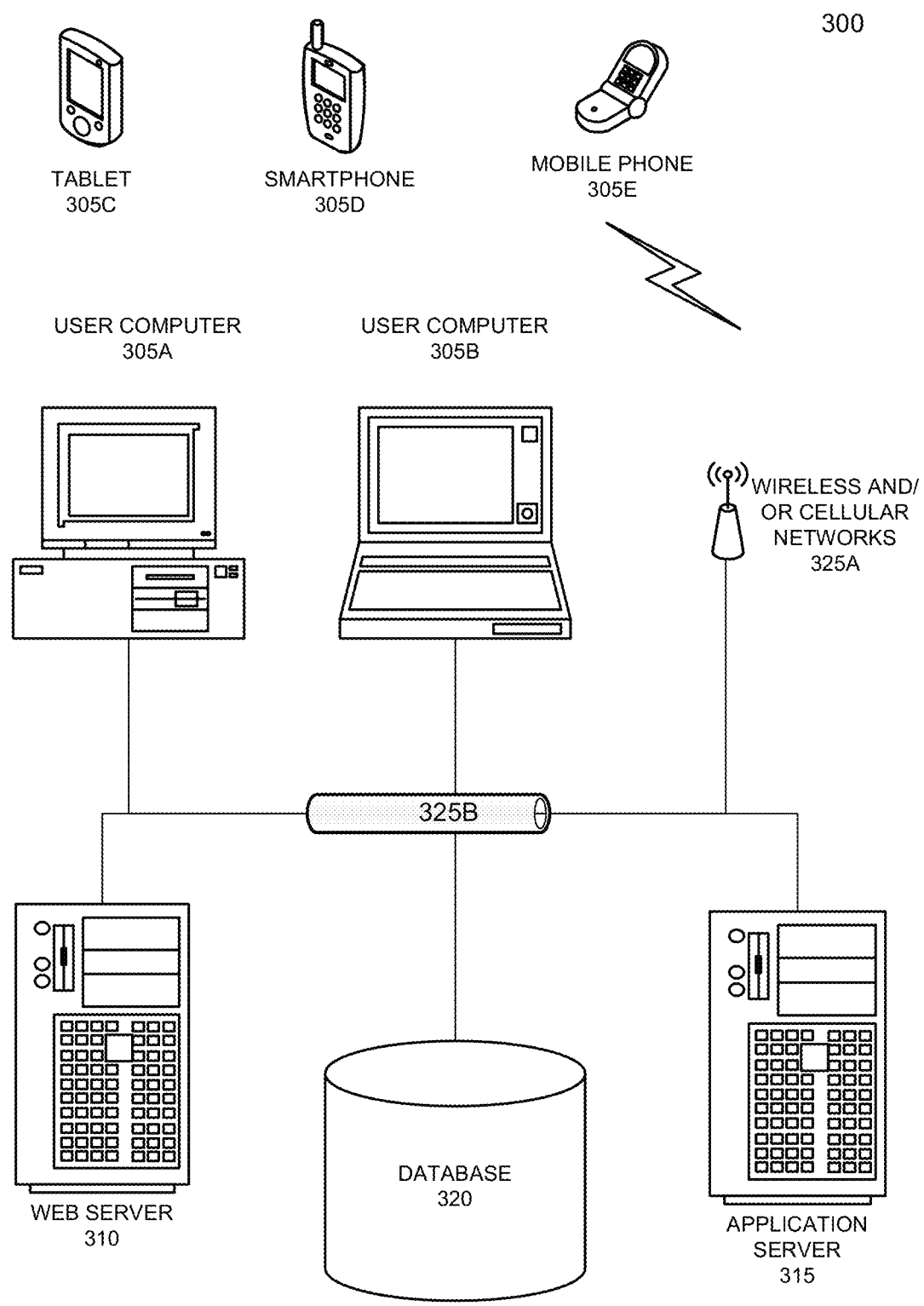
FIG. 3 illustrates a system suitable for implementing embodiments of the invention.

FIG. 3 illustrates a system suitable for implementing embodiments of the invention. FIG. 3 shows an example computer and network system architecture 300 suitable for implementing embodiments of the invention. The system includes user computers 305 including portable 305A and desktop personal computers 305B, tablets 305C, smartphones 305D, and mobile phones 305E. The system can interface with any type of electronic device, such as a thin-client computer, Internet-enabled mobile telephone, mobile Internet access device, tablet, electronic book, or personal digital assistant, capable of displaying and navigating web pages or other types of electronic documents. Although the system is shown with five user computers, any number of user computers can be supported.

A web server 310 is used to process requests from web browsers and standalone applications for web pages, electronic documents, enterprise data or other content, and other data from the user computers. The server 310 may also provide the menu application, as well as syndicated content, such as RSS or Atom feeds, of data related to enterprise operations.

Application server 315 operates one or more mobile applications. The mobile applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails, Enterprise JavaBeans, or .NET.

The data applications on application server 315 process input data and user computer requests and can store or retrieve data from database 320. Database 320 stores data created and used by the data applications. In an embodiment, the database 320 is a relational database, such as MySQL, that is adapted to store, update, and retrieve data in response to SQL format commands. In other embodiments, unstructured data storage architectures and NoSQL databases may also be used.

In an embodiment, the application server 315 is one or more general-purpose computers capable of executing programs or scripts. In an embodiment, the web server 310 is implemented as an application running on one or more general-purpose computers. The web server and application server may be combined and executed on the same computers.

An electronic communication network 325 enables communication between user computers 305, web server 310, application server 315, and database 320. In an embodiment, network 325 may further include any form of electrical or optical communication devices, including wireless 325A and wired 325B networks. Network 325 may also incorporate one or more local-area networks, such as an Ethernet network; wide-area networks, such as the Internet and cellular carrier data networks; and virtual networks, such as a virtual private network.

The system is one example for executing mobile applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a computer system, for displaying tabular formatted data that cannot be legibly displayed in its entirety on a single display screen, comprising:

generating a graphical user interface screen including a display area on the single display screen for displaying tabular formatted data;

receiving the tabular formatted data from a computer database, wherein the tabular formatted data is configured as a single table providing a contiguous single view of the tabular formatted data arranged in at least a first dimension, and wherein the tabular formatted data is too large to be legibly displayed in its entirety within the display area as the single table;

while maintaining continuity of the single table, displaying only a portion of the tabular formatted data in the display area;

receiving a split command from a user, wherein the split command includes a split index for splitting the tabular formatted data in at least the first dimension while maintaining continuity of the single table;

defining contiguous first and second non-overlapping data subsets of the tabular formatted data based on the split index, wherein the first data subset and the second data subset form the single table;

based on the split command, separating the display area in a first data pane and a second data pane;

displaying a first portion of the first data subset in the first data pane and a second portion of the second data subset in the second data pane, wherein the first portion of the first data subset and the second portion of second data subset displayed form the displayed portion of the tabular formatted data; and while maintaining continuity of the single table, limiting the first data pane to a first scroll range in the first dimension corresponding with the first data subset and the second data pane to a second scroll range in the first dimension corresponding with the second data subset.

2. The method of claim 1, wherein defining the first and second data subsets of the tabular formatted data comprises:
setting a first scroll boundary based on the split index.

3. The method of claim 1, wherein defining the first and second data subsets of the tabular formatted data comprises:
partitioning the tabular formatted data into the first and second data subsets.

4. The method of claim 1, wherein limiting the first data pane to the first scroll range and the second data pane to the second scroll range further comprises:
receiving a scroll input including a selection of the first or second data pane;
determining if the scroll input would cause the selected data pane to scroll outside its corresponding data subset;
in response to the determination that the scroll input would cause the selected data pane to scroll outside its corresponding data subset, modifying the scroll input to be limited to its corresponding data subset; and
scrolling the selected data pane by the potentially modified scroll input.

5. The method of claim 1, further comprising:
displaying a table header for the tabular formatted data.

6. The method of claim 5, comprising receiving scroll inputs for the table header.

7. The method of claim 1, wherein the tabular formatted data is further arranged in a second dimension.

8. The method of claim 7, comprising:
jointly scrolling the first and second data panes in the second dimension in response to a scroll input in the first dimension.

9. The method of claim 7, wherein the split command further includes a second split index for splitting in the second dimension, the method comprising:
defining contiguous third and fourth data subsets of the tabular formatted data based on the split index;
displaying at least a portion of the third data subset in a third data pane and at least a portion of the fourth data subset in a fourth data pane; and
limiting the third data pane to a third scroll range in the second dimension corresponding with the third data subset and the fourth data pane to a fourth scroll range in the second dimension corresponding with the second data subset, wherein the first, second, third, and fourth data subsets form the single table.

10. The method of claim 9, comprising:
jointly scrolling the third and fourth data panes in the first dimension in response to a scroll input directed in the first dimension.

11. The method of claim 9, comprising:
displaying table headers for the portion of the tabular formatted data; and
jointly scrolling the table headers with the data panes.

12. A method, performed by a computer system, for displaying tabular formatted data that cannot be legibly displayed in its entirety on a single display screen in a graphical user interface, comprising:
receiving the tabular formatted data from a computer database, wherein the tabular formatted data is configured as a single table providing a contiguous single view of the tabular formatted data which is too large to be legibly displayed in its entirety on the display screen within a display area as the single table;
in the graphical user interface, creating a view area for tabular formatted data displayed as the single table;
while maintaining continuity of the single table, displaying only a portion of the tabular formatted data in the view area;
receiving a split command and a data entity selection;
while maintaining the continuity of the single table, splitting the tabular formatted data into at least two contiguous non-overlapping subsets, based on the split command and the data entity selection;
splitting the view area into at least two adjacent data panes, wherein each data pane is associated with one subset, and wherein each data pane is configured to only display tabular formatted data from its associated subset, and wherein an arrangement of the data panes prevents contradicting relative locations of viewable and scrollable data from their respective subsets, wherein viewable portions of the at least two subsets define contiguous non-overlapping portions of the single table; and
setting at least a first scroll boundary for the data panes based on the data entity selection.

13. The method of claim 12, further comprising:
receiving a scroll input including a selection of at least one of the data panes;
determining if the scroll input would cause the selected data pane to cross the first scroll boundary;
in response to the determination that the scroll input would cause the selected data pane to cross the scroll boundary, modifying the scroll input to be limited to the first scroll boundary; and
scrolling the selected data pane by the potentially modified scroll input.

14. The method of claim 12, wherein the view area is a table view.

15. The method of claim 12, wherein the view area is split into at least four adjacent data panes.

16. The method of claim 12, setting at least a second scroll boundary for the data panes based on the data entity selection.

17. The method of claim 16, wherein the first scroll boundary is perpendicular to the second scroll boundary.

18. The method of claim 12, wherein the first scroll boundary is based on a table row of the data entity selection.

19. The method of claim 12, wherein the first scroll boundary is based on a table column of the data entity selection.

20. A tangible, non-transitory computer-readable information storage medium including instructions executable by a processor for a method of displaying tabular formatted data that cannot be legibly displayed in its entirety on a single display screen in a graphical user interface screen, the method comprising:
generating a display area on the single display screen for displaying tabular formatted data configured as a single table in the user interface;
receiving the tabular formatted data from a computer database, wherein the tabular formatted data is configured as a single table providing a contiguous single view of the tabular formatted data arranged in at least a first dimension, and wherein the tabular formatted data is too large to be legibly displayed in its entirety within the display area as the single table;
while maintaining continuity of the single table, displaying only a portion of the tabular formatted data in the display area;
receiving a split command from a user, wherein the split command includes a split index for splitting the tabular formatted data in at least the first dimension while maintaining continuity of the single table;

defining contiguous first and second non-overlapping data subsets of the tabular formatted data based on the split index, wherein the first data subset and the second data subset form the single table;

based on the user's split command, separating the area in a first data pane and a second data pane;

displaying a first portion of the first data subset in the first data pane and a second portion of the second data subset in the second data pane, wherein the first portion of the first data subset and the second portion of second data subset displayed form the displayed portion of the tabular formatted data; and while maintaining continuity of the single table, limiting the first data pane to a first scroll range in the first dimension corresponding with the first data subset and the second data pane to a second scroll range in the first dimension corresponding with the second data subset.

21. A system comprising:

a client system including a graphical user interface screen;

a database storing tabular formatted data that cannot be legibly displayed in its entirety within a display area as a single table on a single display screen; and an application server connected with the database and the client system via at least one network, wherein the application server is adapted to retrieve the tabular formatted data from the database and communicate the retrieved tabular formatted data with the client system;

wherein the client system includes an application including instructions executable by the client system to perform a method comprising:

generating a display area for displaying the tabular formatted data in the graphical user interface;

receiving the tabular formatted data from the database, wherein the tabular formatted data is configured as a single table providing a contiguous single view of the tabular formatted data arranged in at least a first dimension, and wherein the tabular formatted data is too large to be legibly displayed in its entirety within the display area as the single table on the display screen;

while maintaining continuity of the single table, displaying a portion of the tabular formatted data in the display area;

receiving a split command from a user, wherein the split command includes a split index for splitting the tabular formatted data in at least the first dimension;

defining contiguous first and second non-overlapping data subsets of the tabular formatted data based on the split index, wherein the first data subset and the second data subset form the single table;

based on the user's split command, separating the display area in a first data pane and a second data pane;

displaying a first portion of the first data subset in the first data pane and a second portion of the second data subset in the second data pane, wherein the first portion of the first data subset and the second portion of second data subset displayed form the displayed portion of the tabular formatted data; and while maintaining the continuity of the single table, limiting the first data pane to a first scroll range in the first dimension corresponding with the first data subset and the second data pane to a second scroll range in the first dimension corresponding with the second data subset.

* * * * *